(12) United States Patent
Vohwinkel

(10) Patent No.: US 6,889,874 B2
(45) Date of Patent: May 10, 2005

(54) DOSING DEVICE FOR BULK GOODS

(75) Inventor: Horst Vohwinkel, Düsseldorf (DE)

(73) Assignee: Brabender Technologie KG, Duisburg (DE)

( * ) Notice: Subject to any disclaimer, the term of this patent is extended or adjusted under 35 U.S.C. 154(b) by 0 days.

(21) Appl. No.: 10/470,179

(22) PCT Filed: Mar. 19, 2002

(86) PCT No.: PCT/EP02/03014

§ 371 (c)(1),
(2), (4) Date: Jul. 22, 2003

(87) PCT Pub. No.: WO02/075260

PCT Pub. Date: Sep. 26, 2002

(65) Prior Publication Data

US 2004/0050873 A1 Mar. 18, 2004

(30) Foreign Application Priority Data

Mar. 19, 2001 (DE) ......................................... 101 13 462

(51) Int. Cl.[7] .............................................. G01F 11/20
(52) U.S. Cl. ...................... 222/198; 222/201; 222/203; 222/234; 222/413
(58) Field of Search ......................... 22/196, 198, 201, 22/202, 203, 232, 233, 234, 413

(56) References Cited

U.S. PATENT DOCUMENTS

| | | | | |
|---|---|---|---|---|
| 5,054,658 A | * | 10/1991 | Aronie | 222/232 |
| 5,160,016 A | * | 11/1992 | Moksnes | 198/533 |
| 5,215,228 A | * | 6/1993 | Andrews et al. | 222/203 |
| 5,381,967 A | * | 1/1995 | King | 239/659 |
| 6,062,720 A | * | 5/2000 | Ionadi | 366/117 |
| 6,182,869 B1 | * | 2/2001 | Birky | 222/196 |
| 6,382,470 B1 | * | 5/2002 | Hu et al. | 222/203 |

FOREIGN PATENT DOCUMENTS

| | | |
|---|---|---|
| DE | 1 972 484 | 11/1967 |
| DE | 21 30 593 | 1/1973 |
| DE | 295 10 792 | 2/1996 |
| DE | 196 17 423 | 11/1996 |
| WO | WO 91/06491 | 5/1991 |

OTHER PUBLICATIONS

Brochure No. 100 d/e/f/ LG 3, "Der Brabender–Flex–Wall–Dosierer" (Aug. 1997).

"Schneckendosierer" (Chemie Produktion ONLINE, Dec. 2001).

* cited by examiner

Primary Examiner—Joseph A. Kaufman
(74) Attorney, Agent, or Firm—Herbert Dubno

(57) ABSTRACT

A dosing device for bulk goods comprises a mounting frame (2) in which a trough (4) with a dosing screw (28) is arranged, a drive motor (30) and at least one first vibrating paddle (48). The trough (4) comprises two opposing sidewalls (14, 16), of which at least one flexible sidewall (14) is flexible and the vibrating paddle (48) is arranged on said flexible sidewall (14). The upper edges of said sidewalls (14, 16) are not parallel to each other. A significant improvement in mass flow may be achieved, with a particularly effective prevention of cavity formation, whereby any bulk goods bridges which are formed are rapidly and effectively broken. Even bulk goods which have a clearly poor flow characteristic and tend to clump or stick to the trough sidewalls can be dosed without problems.

17 Claims, 8 Drawing Sheets

DOSING DEVICE FOR BULK GOODS

The present invention relates to a dosing device for bulk goods, comprising a mounting frame in which a trough with a dosing screw is arranged, further a drive motor and at least one first vibrating paddle, the trough having at least two opposing side walls, at least one of these side walls being flexible and the vibrating paddle being arranged on said flexible side wall.

The dosing device is preferably configured as follows: the entire trough consists of a flexible material and may be suspended in the mounting frame. The drive motor is arranged in the back region of the mounting frame. The vibrating paddles are arranged at the sides next to the suspended trough.

Dosing devices of this type are known and are used in various industries, for example in chemical plant, pharmaceutical plant, food plant, etc. In order to keep the bulk goods, for example powder, granules, pellets, flakes, chips, flocks, fibers and the like free-flowing and to prevent sticking on the trough walls, arrangements for the periodic inward arching of predetermined wall regions are provided at least on the side walls of the trough, which is square in a plan view and assist the natural flow characteristic of the bulk goods by activating the bulk goods in order to prevent compaction, bridging and sticking.

Brochure No. 1000 d/e/f LG 3, "Der Brabender-FlexWall®-Dosierer", manufactured by Brabender Technologie KG, Kulturstraβe 55–73, D-47055 Duisburg, discloses a dosing device of this type in which so-called paddles arranged on motor-driven oscillating shafts, strike the trough walls from the exterior. Individual drive motors are provided in each case for the dosing screw on the one hand and the paddles on the other hand. The fitting of two drive motors with their respective mechanical and electrical installation make the dosing device complex and expensive in terms of construction and assembly and in terms of the space required and the overall weight of the device.

Despite the advantages of said dosing device, it still requires improvement with respect to the mass flow, prevention of cavity formation and bulk goods bridges in the trough, in particular in the case of bulk goods having poor flow characteristics.

It is accordingly the object of the invention, with the dosing device mentioned at the outset, to achieve a further considerable improvement in the mass flow with particularly effective prevention of cavity formation in the trough, any bulk goods bridges which have already formed being broken rapidly and effectively. Even bulk goods which have poor flow characteristics and tend to clump and to stick on the trough walls should be able to be dosed without difficulty.

This object is achieved according to the invention with the dosing device mentioned at the outset in that the upper edges of said side walls are not parallel to one another.

The problem of possible bulk goods bridges and cavity formation is solved particularly advantageously and effectively by the combination of the geometry according to the invention of the trough with paddles acting on the corresponding side walls.

It is particularly advantageous if the side walls of the trough and the non-parallel upper edges converge toward the bottom region in the form of a wedge and the dosing screw is arranged in this bottom region of the trough.

Owing to this overall form of the trough (see also FIGS. 7 and 9), the angles of inclination of the side walls with the non-parallel upper edges differ in the direction from the front at the screw outlet to the back. Owing to this trough geometry, a bulk goods bridge or a cavity cannot be formed or can only be formed in an unstable manner. A bulk goods bridge which is possibly still formed in the case of bulk goods having poor flow characteristics is destabilized and destroyed more effectively and rapidly by the movement of the paddles acting on the flexible side walls because the side walls which form the supports for the bulk goods bridge, unlike in troughs with rectangular geometry, converge in a non-parallel manner (see also FIGS. 8 and 10).

Owing to the oblique position of the paddles, which extend parallel to the respective flexible side wall, a dynamic transverse component acts in the direction of the dosing screw and, owing to the oblique position of the side walls, a static transverse component additionally acts on the bulk goods, the combination of the two transverse components being particularly effective in preventing or destroying bulk goods bridges. This applies, in particular, when two opposing paddles are arranged on the trough and the paddles move in the same direction, not in opposite directions. Movement of the paddles in opposite directions, in other words when the paddles move toward one another and then apart again is in fact generally undesirable as this mode of operation would lead to compaction of the bulk goods located in the trough. This applies, in particular, to bulk goods which have a tendency to the known and feared "snowball effect", namely clumping and compaction, even when minimal pressure is exerted.

In a particularly advantageous embodiment of the invention it is provided that the upper edges of the non-parallel side walls converge in the direction of the outlet of the dosing screw. In fact, as the flexible side walls, which periodically arch to and fro, throw the bulk goods backward to the wide end of the trough, the bulk goods purposefully reach the part of the bottom region of the trough filled by the screw flight. The bulk goods are discharged at the narrow end of the trough at which the outlet is arranged. This embodiment results in particularly advantageous synergistic cooperation of the features of trough geometry and the arrangement of the outlet which leads to optimum emptying of residues from the dosing device.

In a further preferred embodiment of the invention, the trough has a trapezoidal shape in the plan view from above, the dosing screw being arranged substantially at right angles to the parallel sides of the trapezoid. The term "trapezoid" is interpreted in the conventional manner as a plane quadrilateral with two parallel sides of unequal lengths.

It is advantageous if at least one respective vibrating paddle is arranged on each of said opposing side walls and both side walls are flexible. The bulk goods are therefore moved mechanically from both sides of the dosing device.

If the desired dosing capacity is greater than that of a single dosing device, it is more expedient to arrange a plurality of standard dosing devices in a circle round the discharge point than to have a single correspondingly greater dosing device especially produced for one purpose. This also simplifies maintenance and procurement of spare parts. It is particularly advantageous for achieving the most compact arrangement of the individual dosing devices in the circle if the angle enclosed by the non-parallel upper edges forms an integer fraction of the full circle and, in particular, is 60°.

For the same reasons, it is advantageous if an arrangement of a plurality of identical dosing devices arranged in a closed or open circle round a central discharge point is provided.

It is further provided that the drive motor is pivotal between an operating position coupled to the dosing screw and an uncoupled shutdown position, wherein the vibrating paddle(s) may be driven with an oscillating shaft via an oscillating drive, wherein means are provided for an oscillating drive connection between the drive motor of the dosing screw and the oscillating shaft of the vibrating paddle or the vibrating paddles.

The oscillating drive preferably drives an oscillating shaft, arranged substantially parallel to a side wall of the trough, with the vibrating paddle.

As a result, the dosing device is simpler in terms of construction and assembly, requires less space and has a lower overall weight than the above-mentioned known dosing device, and the dosing screw and the bearing can easily and quickly be pulled out backwards for disassembly.

Preferably, the module consisting of the gear means and the drive motor of the dosing screw is arranged pivotally as a whole so the dosing screw and bearing can be pulled out backwards, i.e. counter to the conveying direction.

It has been found that, even when allowing for the design and constructional complexity of this gear means—the overall complexity and therefore the total cost of the dosing device according to the invention is lower than that of a dosing device of the known type.

In a preferred construction solution it is provided that the gear means be associated with the pivotal drive motor and comprise connecting means to maintain the driving connection from the gear means to the pivot shaft of the paddle even when the drive motor is pivoted into the shutdown position, without disassembling any parts, as shown in more detail by means of an embodiment. According to a further embodiment, the gear means may also be associated with the mounting frame and be coupled thereto, for example when the drive motor pivots into the operating position thereof, in a similar manner to the dosing screw, or else may form a continuous drive connection with a gear element in the power train of the dosing screw, as shown in a further embodiment.

In one construction solution of the invention, the means comprise a crank mechanism which is connected in terms of drive to the drive motor and is connected via a connecting rod to a crank arm arranged on the oscillating shaft. Crank mechanisms are components of very simple design which are widely used for converting rotational movements into oscillating movements.

For changing the amplitude of the paddles, it is further provided that the eccentricity of the drive motor-side and/or oscillating shaft-side link point of the connecting rod to the crank mechanism or crank arm is variable. In this embodiment, the amplitude of the oscillating movement of the paddle increases, the greater the eccentricity of the respective link point.

In a preferred embodiment of the invention, the drive motor-side crank mechanism comprises a rotationally driven crank disc with one or more link points, arranged eccentrically to the axis of rotation of the crank disc, for the connecting rod. A solution of this type is extremely simple and inexpensive in construction.

In a further embodiment of the invention, it is provided that the crank disc is an output gear-wheel of gearing driven by the drive motor. Gearing of this type allows easy production of different reduction or transmission ratios between the rotational frequency of the drive motor of the dosing screw and the striking frequency of the paddle.

For adapting this reduction or transmission ratio between screw speed and paddle frequency to different bulk goods, it is provided in a further embodiment of the invention that the output gear-wheel (crank disc) and/or a drive gear-wheel cooperating therewith of the gearing may be exchanged in order to change the transmission, to create different pairs of gears.

A particularly simple constructional solution is achieved if the crank disc is a toothed belt disc connected in terms of drive to a drive gear-wheel which is arranged on the output shaft of the drive motor and is configured as a toothed belt disc, via a toothed belt. Toothed belt gears of this type have the advantage that they are substantially maintenance free and run with minimal noise.

With the previously mentioned solution with gear means associated with the pivotal drive motor, it is provided that the drive-side crank mechanism is arranged on a carrier which carries the drive motor and is mounted pivotally about the pivot axis on the mounting frame and that the connecting rod is connected to the oscillating shaft-side crank arm via a hinged joint of which the hinge axis is at least substantially aligned with the pivot axis of the carrier in a predetermined oscillating position of the crank arm. In the predetermined oscillating position of the crank arm, the hinge joint allows a pivoting movement of the connecting rod about the hinge axis when the carrier is pivoted about the pivot axis aligned with the hinge axis. The above-described solution allows dosing devices without paddle mechanisms to be converted in a particularly simple manner at a later stage.

To allow the oscillating movement of the connecting rod in the crank plane, the connecting rod is connected to the hinged joint via a further connecting hinged joint with a joint axis at right angles to the hinge axis and to the longitudinal axis of the connecting rod.

Dosing devices of the type mentioned at the outset generally have paddles arranged on both sides of the trough; in such a case, it is further provided according to the invention that at least one further paddle is arranged in the mounting frame on the side, remote from the first paddle, of a trough and that an oscillating shaft of the further paddle is coupled to the oscillating shaft of the first paddle via a gear mechanism.

With a trough which is trapezoidal in a plan view, the oscillation axes of the two paddles are not arranged in parallel but obliquely to one another so the movements take place in a non-linear manner and necessitate a correspondingly complex construction of the coupling and the transfer of force.

This gear mechanism preferably comprises one respective crank arm arranged on each oscillating shaft, the crank arms being connected to one another via a connecting rod. It is therefore proposed that the means for an oscillating drive connection between the drive motor and the oscillating shaft are configured as a gear mechanism which comprises a respective crank arm arranged on each oscillating shaft and in that the crank arms are connected to one another via a connecting rod.

A plurality of embodiments of the invention are described in more detail hereinafter and illustrated in the drawings, in which.

Figure 1:
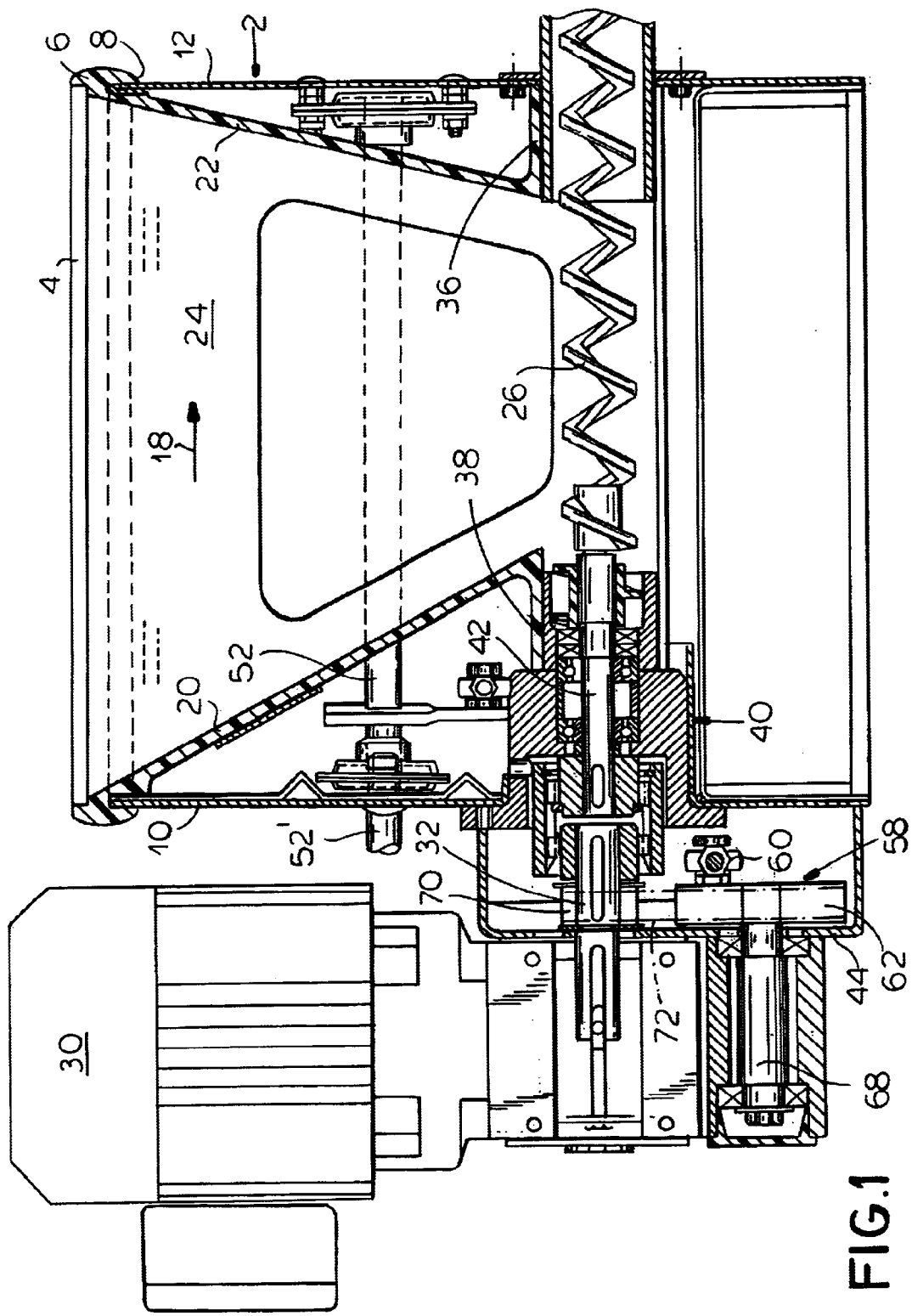
FIG. 1 is a schematic side view of a dosing device.

The dosing device shown in FIGS. 1 to 5 comprises a substantially housing-like mounting frame 2 in the upper opening of which a trough 4 may be suspended in such a way that the upper peripheral edges 6 of the trough 4 overlap the upper peripheral edges 8 of the housing-like mounting frame 2.

The housing-like mounting frame 2 has a back wall 10 and a front wall 12 which are vertical and parallel to one another, as well as two side walls 14, 16 which also extend vertically but converge in the direction of the arrow 18 so the mounting frame 2 is trapezoidal in a plan view with a central plane of symmetry 19. This type of form is preferably selected if a plurality of dosing devices are to be arranged in a circle round a central discharge point.

The trough 4 has a substantially wedge-shaped configuration. It has a back wall 20 and a front wall 22 which each form different angles of inclination with the vertical, as well as two side walls 24 (see also FIGS. 4 and 5) which, in the embodiment illustrated, are arranged symmetrically to a vertical longitudinal centre plane of the trough 4, which coincides with the plane of symmetry 19 of the mounting frame 2, and converge at the bottom so that they form a bottom channel 26. The side walls 24 also converge from the back wall 20 to the front wall 22 so as to match the trapezoidal form of the mounting frame.

In the bottom channel 26 there is arranged, in a manner also known per se, a dosing screw 28 which may be driven by a drive motor 30 arranged in the back region of the mounting frame 2 via a drive shaft 32 which may be coupled to the dosing screw 28 and conveys the bulk goods located in the trough 4 outwardly via an outlet nozzle 34. When the trough 4 is suspended in the mounting frame 2, the outlet nozzle 34 is received in a leading bearing shoulder 36 of the trough 4; a trailing bearing shoulder 38 of the trough 4 receives the leading portion of a bearing and coupling arrangement 40 with a connecting shaft 42 and the bearing thereof. The connecting shaft 42 produces a driving connection between the drive shaft 32 of the drive motor 30 and the dosing screw 28, as shown clearly in FIGS. 1 to 3.

Figure 2:
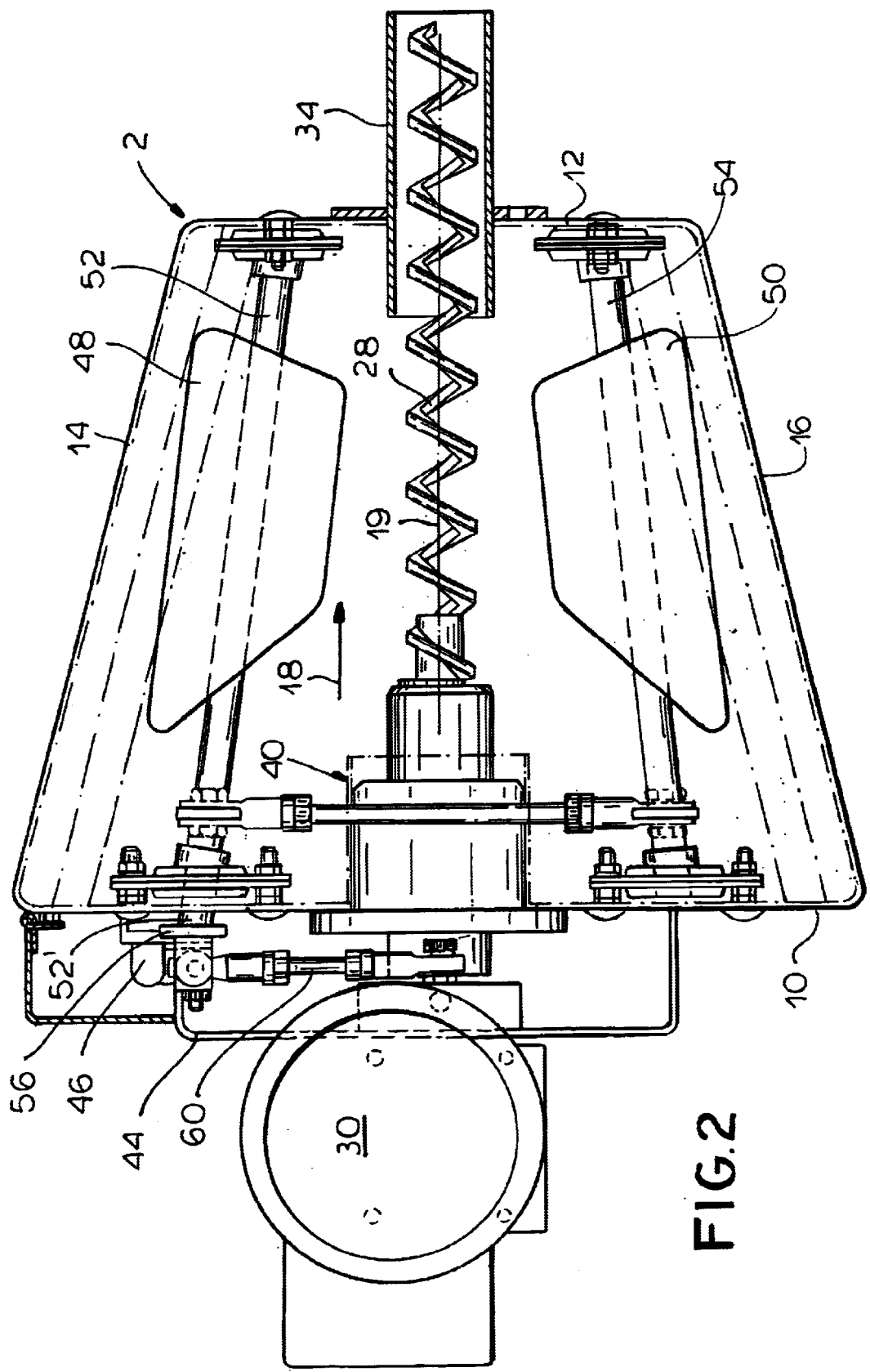
FIG. 2 is a plan view of a dosing device (shown without the trough 4) according to FIG. 1, with the drive motor in an operating position.
Figure 3:
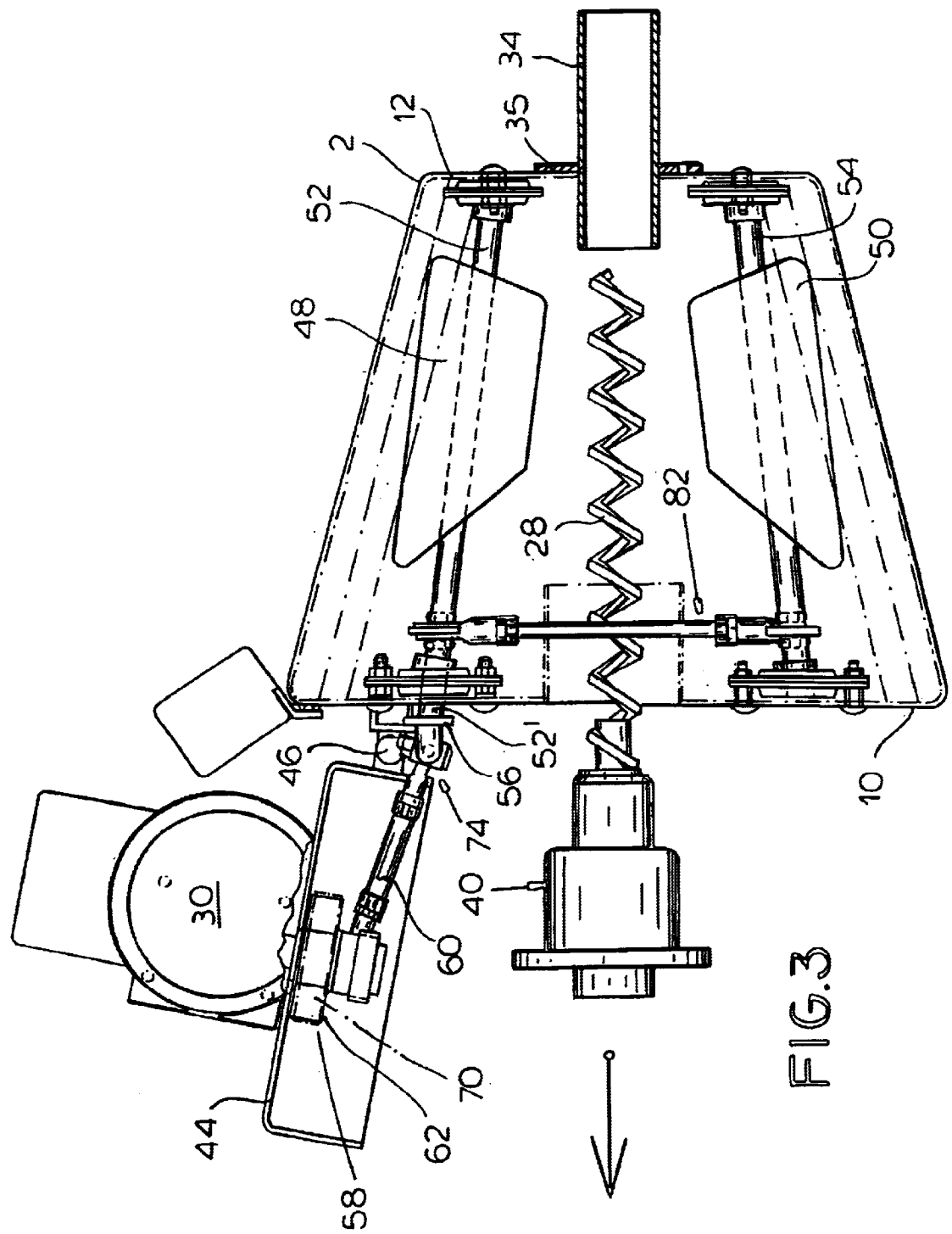
FIG. 3 is a reduced plan view (shown without the trough 4) substantially according to FIG. 2, in which the drive motor is pivoted into a shutdown position.

The drive motor 30 is fastened to a carrier 44 which may be pivoted about a vertical hinge axis 78 from the operating position shown in FIG. 2 into the shutdown position shown in FIG. 3 by means of a hinge 46 on the back wall 10 of the mounting frame 2. To enable the trough 4, for example, to be removed from the mounting frame 2, the carrier 44 with the drive motor 30 arranged thereon, may be pivoted into the shutdown position shown in FIG. 3, the drive shaft 32 being uncoupled from the connecting shaft, whereupon the bearing and coupling arrangement 40 together with the dosing screw 28 coupled thereto may be removed at the back; the outlet nozzle 34 fastened on the front wall 12 by means of a flange 35 may also be released and removed at the front. The trough 4 is therefore released and may be lifted upwardly from the mounting frame 2. Insertion of a trough 4 into the mounting frame 2 similarly takes place in reverse sequence.

The trough 4 consists of a flexible plastics material, preferably of a polyurethane material, so that its walls may easily be deformed, i.e. arched inwardly. As shown in the figures, what are known as vibrating paddles 48, 50, each arranged on associated oscillating shafts 52 and 54, are provided in each case next to the trough 4 in the mounting frame 2. The paddles 48, 50 perform torsional vibration movements, striking the side walls 24 of the trough 4 and loosening the bulk goods located in the trough. As shown in FIGS. 1 to 4, the respective oscillating shafts 52, 54 are fastened by associated bearings, not described in detail, on the back wall 10 and the front wall 12 of the mounting frame 2. The oscillating shaft 52 is extended outwardly beyond the back wall 10 of the mounting device 2; a crank arm 56 by means of which a torsional vibration movement may be introduced into the oscillating shaft 52 is arranged on the extension 52'.

The oscillating drive of the oscillating shaft 52 is derived from the drive motor 30 of the dosing screw 28 via special gear means. These gear means comprise a crank mechanism 58 which is connected to the drive motor 30 in terms of drive and is connected via a connecting rod 60 to the crank arm 56. The crank mechanism 58 substantially consists of a rotationally driven crank disc 62 with a link point 66 for the connecting rod 60 arranged eccentrically to the axis of rotation 64 of the crank disc 62. The crank disc 62 is mounted via a crank disc shaft 68 on the carrier 44 to which the drive motor 30 is also fastened. The crank disc 62 forms an output gear-wheel of a transmission which is driven by the drive motor; a drive gear-wheel 70 is splined on the drive shaft 32 of the drive motor 30. The drive gear-wheel 70 and the crank disc 62 are each configured as toothed belt discs which are connected in terms of drive via a toothed belt 72.

As shown, in particular, in FIG. 3, the crank mechanism 58 is arranged rigidly on the carrier 44 and, as the drive motor 30 is pivoted into its shutdown position, the crank mechanism 58 is pivoted therewith. To enable the drive connection from the crank mechanism 58 to the crank arm 56 of the oscillating shaft 52 to be maintained even during this pivoting movement, the connecting rod 60 is connected to the crank arm 56 via a hinge joint 74 of which the hinge axis 76 is at least substantially aligned with the pivot axis 78 of the carrier 44 in a predetermined oscillating position of the crank arm 56 shown in FIG. 4. In this position, the distance between the link point 66 on the crank disc 62 and the hinge axis 76 of the hinge joint 74 remains equal during the pivoting of the carrier 44 so the pivoting movement of the carrier 44 is not obstructed. It has also be found that, if the crank arm 56 does not adopt this predetermined oscillating position, pivoting of the carrier 44 is still possible because the crank disc 62 and/or the crank arm 56 automatically run into a reciprocal position which does not obstruct the pivoting.

The connecting rod 60 is connected to the part of the hinge joint 74 which is rotatable about the hinge axis 76 via a further connecting pivot joint 80 which allows the crank movement of the connecting rod 60 owing to the rotation of the crank disc 62.

Figure 5:
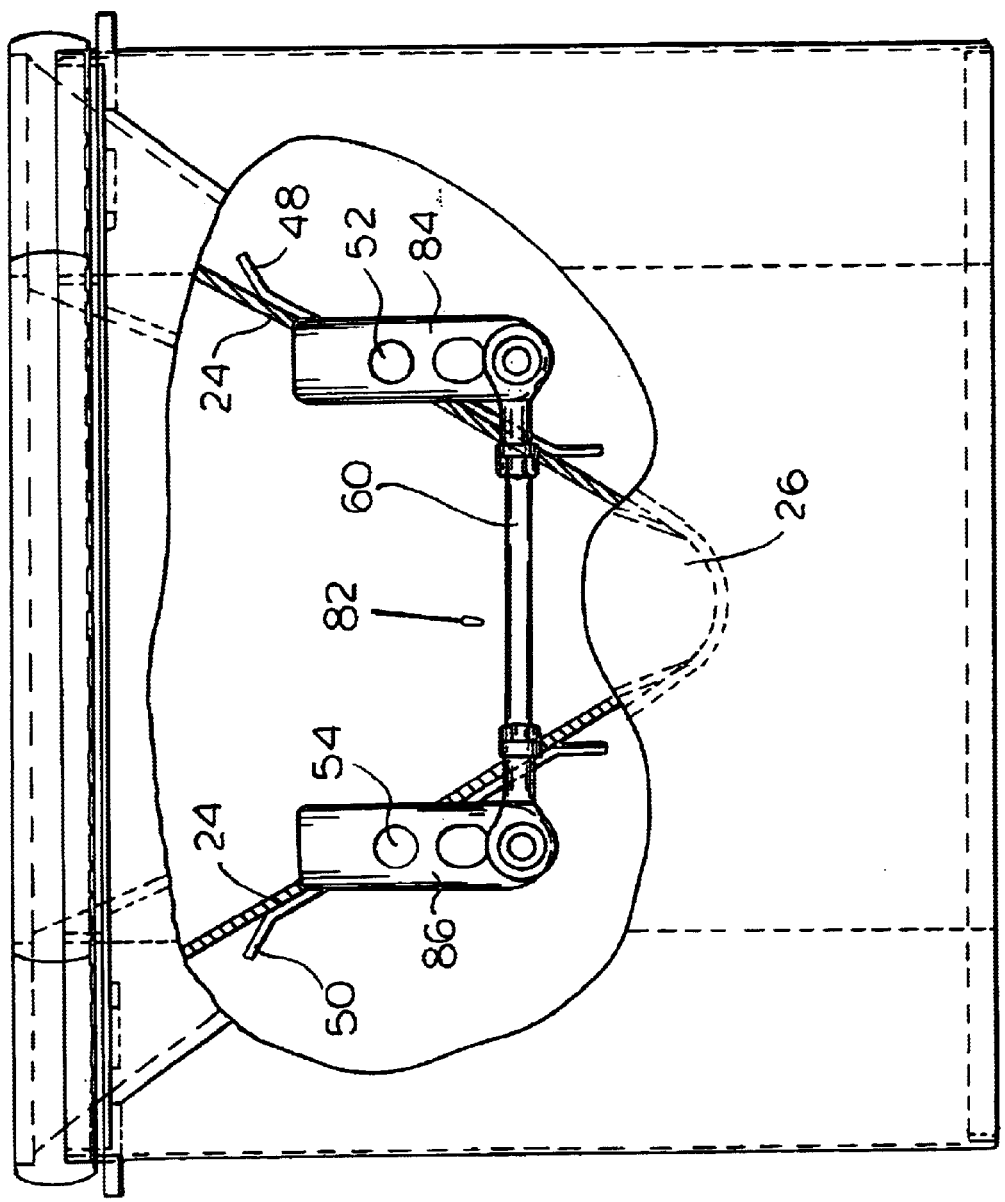
FIG. 5 is a view counter to the direction of the arrow 18 in FIG. 2 showing details of the oscillating drive for a second paddle.

As shown, in particular, in FIGS. 2, 3 and 5, the oscillating shaft 52 of the paddle 48 and the oscillating shaft 54 of the paddle 50 are connected to one another in terms of drive via a gear mechanism 82 arranged inside the mounting frame 2. This gear mechanism 82 comprises a crank arm 84 arranged on the oscillating shaft 52, a crank arm 86 arranged on the oscillating shaft 54 and a connecting rod 88 connecting the crank arms 84, 86. The two paddles 48 and 50 are accordingly each driven in the same direction.

To change the oscillating frequency of the paddles 48, 50, the drive gear-wheel 70 and/or the crank disc 62 may be exchanged so as to produce different transmission ratios between the rotational frequency of the drive shaft 32 and therefore the dosing screw 28 on the one hand and the oscillating frequency of the oscillating shafts 52, 54 on the other hand. It has been found that a ratio of 1:1 is advantageous in the case of bulk goods having poor flow characteristics; the speed of the dosing screw may be three times as high as the oscillating frequency of the paddles in the case of bulk goods having very good flow characteristics. With a standard setting, where the rotational frequency of the dosing screw is twice as high as the oscillating frequency of the paddles, a wide range of diverse bulk goods is optimally covered.

Figure 4:
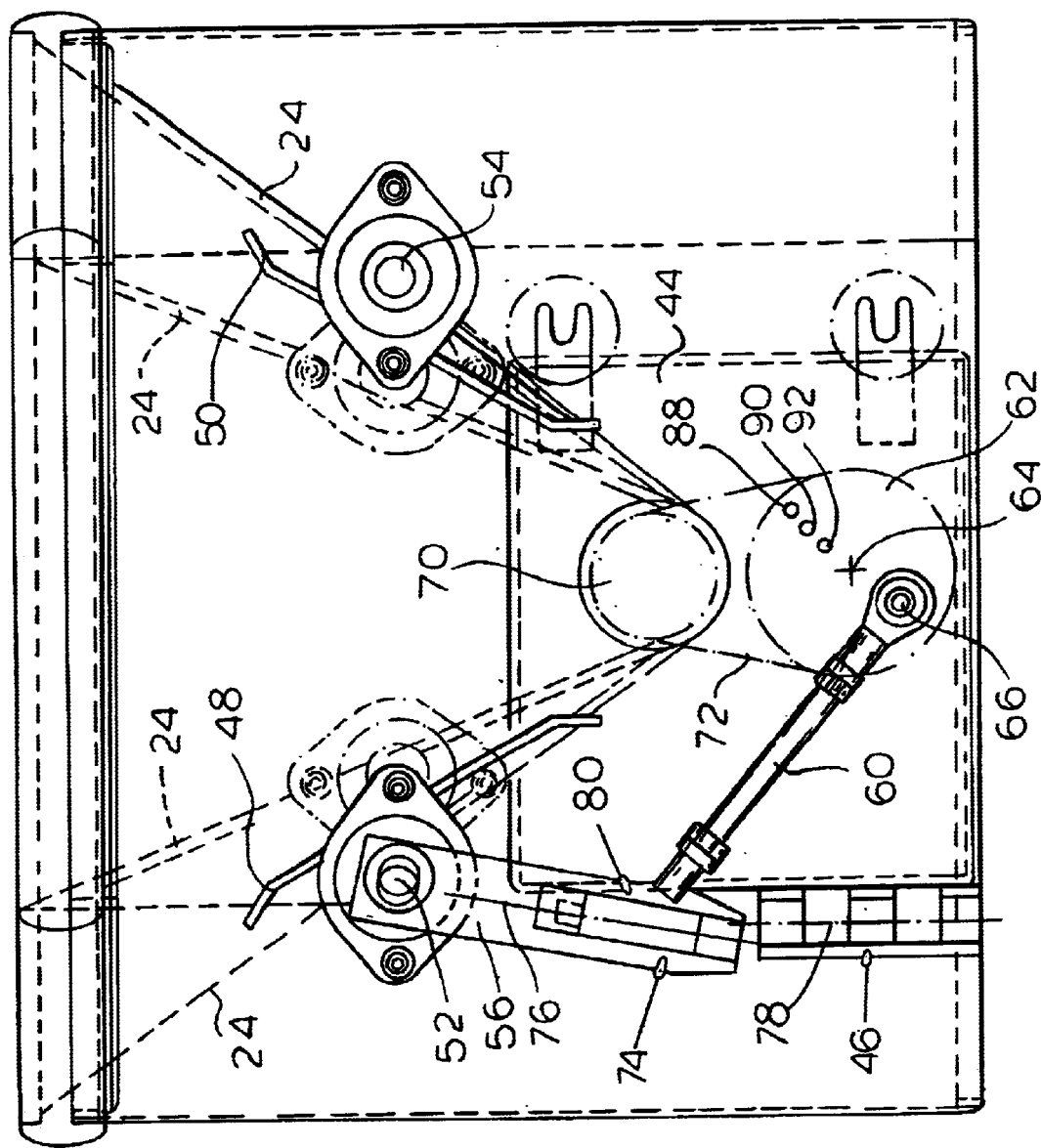
FIG. 4 is a schematic view toward the back wall of the mounting frame showing details of the gear means for the oscillating drive of the paddles.

In order to vary the oscillation amplitude of the paddles 48 and 50, the crank disc 62 is provided with a plurality of link points 66, 88, 90, 92 for linking the connecting rod 60, as indicated schematically in FIG. 4.

Figure 6:
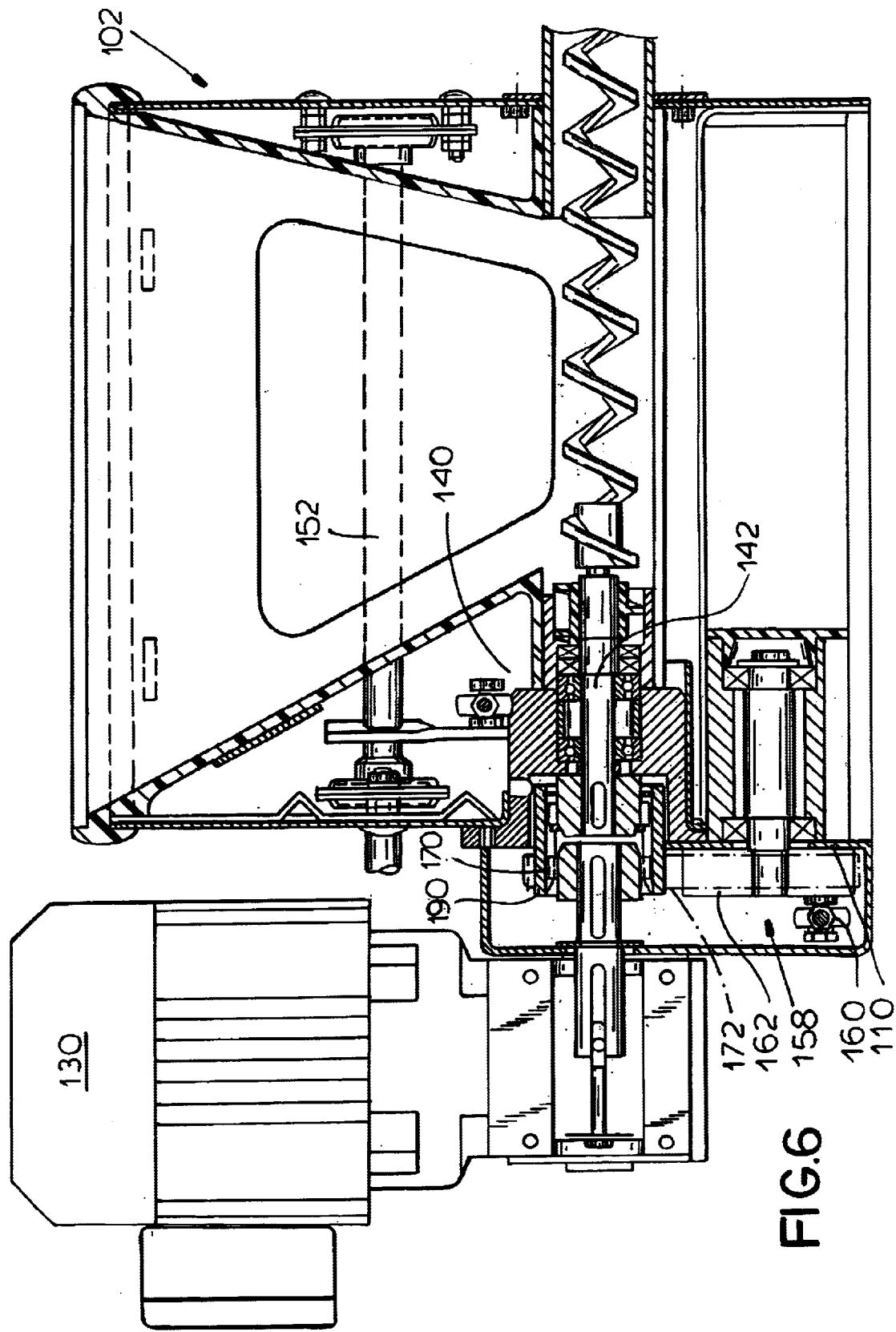
FIG. 6 is a side view substantially corresponding to FIG. 1 of a further embodiment of the dosing device.

FIG. 6 shows a dosing device in a view corresponding to FIG. 1. The dosing device in FIG. 6 differs from the dosing device in FIG. 1 only in the arrangement and formation of the crank mechanism, so it is only necessary to describe the crank mechanism here. The crank mechanism 158, in turn, comprises a crank disc 162 formed as a toothed belt disc and a drive gear-wheel 170 also formed as a toothed belt disc: In contrast to the arrangement according to FIG. 1, the crank disc 162 is mounted on a lower portion of the back wall 110 of the mounting frame 102. The drive gear-wheel 170 is formed by a coupling bush 190 which is a component of the bearing and coupling arrangement 140 and is rotationally connected to the connecting shaft 142. The crank disc 162 and the drive gear-wheel 170 are in turn connected to one another by a toothed belt 172. As the crank mechanism 158 is connected to the mounting frame 102, it remains in place when the drive motor 130 pivots into its shutdown position. A hinge joint corresponding to the hinge joint 74 can therefore be dispensed with, so the crank arm 160 is connected to the crank arm (not shown) of the oscillating shaft 152 merely via a connecting pivot joint corresponding to the connecting pivot joint 80.

FIGS. 7 to 10 illustrate the advantages of the trapezoidal form of the trough. The working space of the dosing screw 28 is designated by reference numeral 206 in FIGS. 9 and 10. The trapezoidal form of the trough 4 (FIGS. 7 and 9) results in angles of inclination of the side walls 14, 16 which differ in the direction from the front at the screw outlet to the back, as shown in particular in FIG. 9. Owing to this trough geometry, a product bridge 204 which might be formed by powder having poor flow characteristics is destroyed more effectively by the movement of the paddles 48, 50 because the trough walls 14, 16 forming the supports for the product bridge 204, in contrast to troughs with rectangular geometry (FIGS. 8 and 10), do not extend in parallel.

Figure 7:
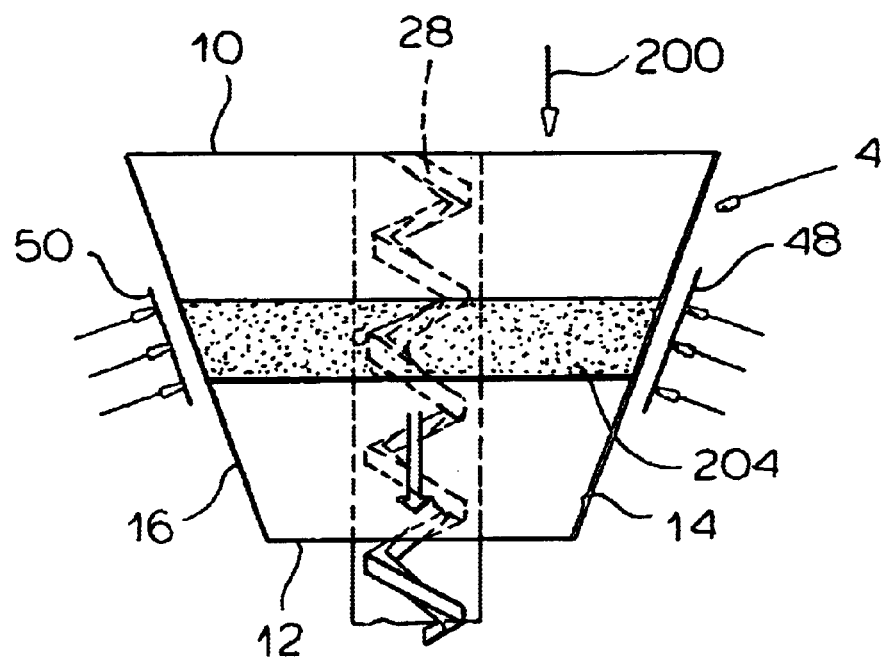
FIG. 7 is a plan view of a trapezoidal trough according to the invention.
Figure 8:
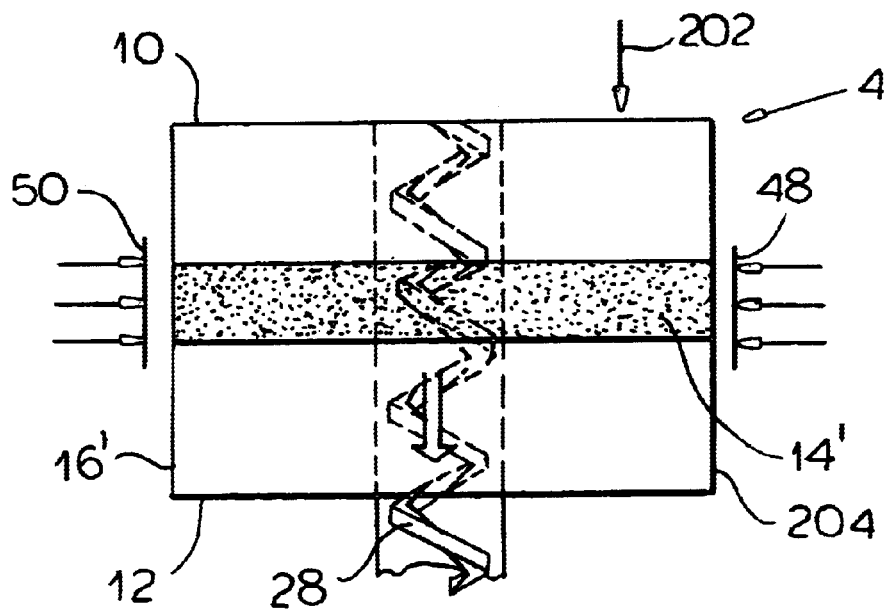
FIG. 8 is a plan view of a rectangular trough according to the prior art.
Figure 9:
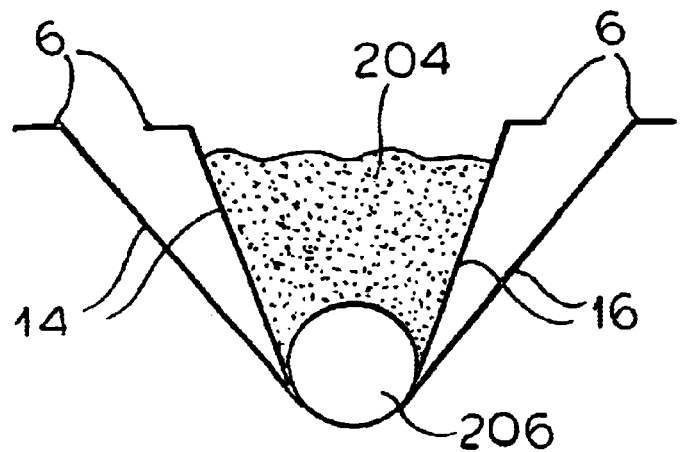
FIG. 9 is a view corresponding to the arrow 200 in FIG. 7 into the interior of the trough.
Figure 10:
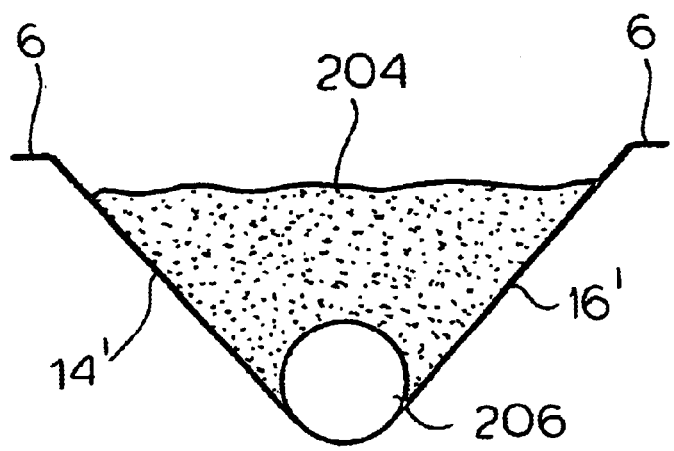
FIG. 10 is a view in the direction of the arrow 202 in FIG. 8, also into the interior of the trough.

The movement of the flexible trough walls 14, 16 due to paddles or other components produce, with the trapezoidal form according to FIG. 7, an oblique force component, shown by arrows in FIG. 7, on the product bridge 204. The transverse component contained therein destroys the product bridge 204 shown in FIGS. 7 and 9 particularly effectively. In contrast, in troughs 4 with a rectangular cross-section in a plan view and therefore side walls 14', 16' extending in parallel, it may happen that the product bridge 204 is further compacted and consolidated by the action of the paddles, as illustrated in FIGS. 8 and 10.

| List of reference numerals | |
|---|---|
| 2 | mounting frame |
| 4 | trough |
| 6 | upper peripheral edge of 4 |
| 8 | upper peripheral edge of 2 |
| 10 | back wall |
| 12 | front wall |
| 14, 14' | side wall |
| 16, 16' | side wall |
| 18 | arrow |
| 19 | plane of symmetry |
| 20 | back wall |
| 22 | front wall |
| 24 | side wall |
| 26 | bottom channel |
| 28 | dosing screw |
| 30 | drive motor |
| 32 | drive shaft |
| 34 | outlet nozzle |
| 35 | flange |
| 36 | bearing shoulder |
| 38 | bearing shoulder |
| 40 | bearing and coupling arrangement |
| 42 | connecting shaft |
| 44 | carrier |
| 46 | hinge |
| 48 | first vibrating paddle |
| 50 | vibrating paddle |
| 52 | oscillating shaft |
| 54 | oscillating shaft |
| 56 | crank arm |
| 58 | crank mechanism |
| 60 | connecting rod |
| 62 | crank disc |
| 64 | axis of rotation |
| 66 | link point |
| 68 | crank disc shaft |
| 70 | drive gear-wheel |
| 72 | toothed belt |
| 74 | hinge joint |
| 76 | hinge axis |
| 78 | pivot axis |
| 80 | connecting pivot joint |
| 82 | gear mechanism |
| 84 | crank arm |
| 86 | crank arm |
| 88 | link point |
| 102 | mounting frame |
| 110 | back wall |
| 130 | drive motor |
| 140 | bearing and coupling arrangement |
| 142 | connecting shaft |
| 152 | oscillating shaft |
| 158 | crank mechanism |
| 160 | connecting rod |
| 162 | crank disc |
| 170 | drive gear-wheel |
| 172 | toothed belt |
| 190 | coupling bush |
| 200 | arrow |
| 202 | arrow |
| 204 | product bridge |
| 206 | working chamber of dosing screw |

What is claimed is:

1. A dosing device for bulk goods, comprising a mounting frame (2) in which a trough (4) with a dosing screw (28) is arranged, further a drive motor (30) and at least one first vibrating paddle (48), the trough (4) having at least two opposing side walls (14, 16), at least one of these side walls (14) being flexible and the vibrating paddle (48) being arranged on said flexible side wall (14), wherein the upper edges of said side walls (14, 16) are not parallel to one another and wherein the upper edges of the non-parallel side walls (14, 16) converge in the direction of the outlet of the dosing screw (28).

2. The dosing device as claimed in claim 1, wherein the side walls (14, 16) of the trough (4) and the non-parallel upper edges converge toward the bottom region in the form of a wedge and wherein the dosing screw (28) is arranged in this bottom region of the trough (4).

3. The dosing device as claimed in claim 1, wherein the trough (4) has a trapezoidal shape in the plan view from above, the dosing screw (28) being arranged substantially at right angles to the parallel sides of the trapezoid.

4. The dosing device as claimed in claim 1, wherein at least one respective vibrating paddle (48, 50) is arranged on each of said opposing side walls (14, 16) and both side walls (14, 16) are flexible.

5. The dosing device as claimed in claim 1, wherein the angle enclosed by the non-parallel upper edges forms an integer fraction of the full circle and, in particular, is 60°.

6. The dosing device as claimed in claim 1, wherein an arrangement of a plurality of identical dosing devices which are arranged in a closed or open circle round a central discharge point is provided.

7. The dosing device as claimed in claim 1, wherein the drive motor (30) is pivotal between an operating position coupled to the dosing screw (28) and an uncoupled shut-down position, wherein the vibrating paddle(s) (48, 50) can be driven with an oscillating shaft (52) via an oscillating drive, wherein means are provided for an oscillating drive connection between the drive motor (30) of the dosing screw (28) and the oscillating shaft (52) of the vibrating paddle (48) or the vibrating paddles (48, 50).

8. The dosing device as claimed in claim 7, wherein the means comprise a crank mechanism (58) which is connected in terms of the drive to the drive motor (30) and is connected via a connecting rod (60) to a crank arm (56) arranged on the oscillating shaft.

9. The dosing device as claimed in claim 8, wherein the eccentricity of the drive motor-side and/or oscillating shaft-side link point (66; 138, 90, 92) of the connecting rod (60) is variable.

10. The dosing device as claimed in claim 8, wherein the drive motor-side crank mechanism (58) comprises a rotationally driven crank disc (62) with one or more link points (66; 88, 90, 92), arranged eccentrically to the axis of rotation (64) of the crank disc (62), for the connecting rod (60).

11. The dosing device as claimed in claim 10, wherein the crank disc (62) is an output gear-wheel of gearing driven by the drive motor (30).

12. The dosing device as claimed in claim 11, wherein the output gear-wheel or a drive gear-wheel (70) cooperating therewith of the gearing can be exchanged in order to change the transmission.

13. The dosing device as claimed in claim 11, wherein the crank disc (62) is a toothed belt disc connected in terms of the drive to a drive gear-wheel (70) which is arranged on the output shaft (32) of the drive motor (30) and is configured as a toothed belt disc, via a toothed belt (72).

14. The dosing device as claimed in claim 8, wherein the drive-side crank mechanism (58) is arranged on a carrier (44) which carries the drive motor (30) and is mounted pivotally about the pivot axis (78) on the mounting frame (2) and wherein the connecting rod (60) is connected to the oscillating shaft-side crank arm (56) via a hinged joint (74) of which the hinge axis (76) is at least substantially aligned with the pivot axis (78) of the carrier (44) in a predetermined oscillating position of the crank arm (56).

15. The dosing device as claimed in claim 14, wherein the connecting rod (60) is connected to the hinged joint (74) via a further connecting hinged joint (80) with a joint axis at right angles to the hinge axis (76) and to the longitudinal axis of the connecting rod (60).

16. The dosing device as claimed in claim 1, wherein at least one further paddle (50) is arranged in the mounting frame (2) on the side, remote from the first paddle (48), of a trough (4) and wherein an oscillating shaft (54) of the further paddle (50) is coupled to an oscillating shaft (52) of the first paddle (48) via a gear mechanism (82).

17. The dosing device as claimed in claim 7, wherein the means for an oscillating drive connection between the drive motor (30) and the oscillating shaft (52) are configured as a gear mechanism (82) which comprises a respective crank arm (84, 86) arranged on each oscillating shaft (52, 54) and in that the crank arms (84, 86) are connected to one another via a connecting rod (60).

* * * * *